(12) United States Patent
Lee et al.

(10) Patent No.: US 10,126,488 B2
(45) Date of Patent: Nov. 13, 2018

(54) DISPLAY DEVICE

(71) Applicant: SAMSUNG DISPLAY CO., LTD., Yongin-si, Gyeonggi-do (KR)

(72) Inventors: Geonwoo Lee, Cheonan-si (KR); Byungjin Kim, Incheon (KR); Kyung-ryul Yu, Cheongju-si (KR); Jungsoo Ok, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 39 days.

(21) Appl. No.: 15/194,305

(22) Filed: Jun. 27, 2016

(65) Prior Publication Data

US 2017/0097462 A1     Apr. 6, 2017

(30) Foreign Application Priority Data

Oct. 2, 2015 (KR) .......................... 10-2015-0139215

(51) Int. Cl.
| | | |
|---|---|---|
| F21V 7/04 | (2006.01) | |
| F21V 8/00 | (2006.01) | |
| G02F 1/1333 | (2006.01) | |

(52) U.S. Cl.
CPC ......... *G02B 6/0088* (2013.01); *G02B 6/0093* (2013.01); *G02F 1/133308* (2013.01); *G02F 2001/13332* (2013.01); *G02F 2001/133314* (2013.01); *G02F 2001/133317* (2013.01); *G02F 2001/133328* (2013.01); *G02F 2201/465* (2013.01)

(58) Field of Classification Search
CPC ............. G02B 6/0038; G02F 1/133615; G02F 1/133616
USPC .......................................... 362/611, 632, 633
See application file for complete search history.

(56) References Cited

U.S. PATENT DOCUMENTS

| | | | | |
|---|---|---|---|---|
| 9,152,233 | B2 * | 10/2015 | Ikeda ....................... | G06F 3/016 |
| 9,291,761 | B2 * | 3/2016 | Bu ........................ | G02B 6/0088 |
| 9,341,767 | B2 * | 5/2016 | Jeong ................... | G02B 6/0091 |
| 2013/0033657 | A1 | 2/2013 | Li et al. | |

FOREIGN PATENT DOCUMENTS

KR     10-2007-0033726 A     3/2007

* cited by examiner

*Primary Examiner* — Daniel St Cyr
(74) *Attorney, Agent, or Firm* — Lewis Roca Rothgerber Christie LLP

(57) ABSTRACT

Exemplary embodiments of the inventive concept provide a display device including a bottom cover having a bottom portion and a sidewall and a support frame. The bottom portion has at least one rounded corner having a first radius, and a sidewall is bent upward from an edge of the bottom portion. The support frame includes at least one rounded corner having a shape corresponding to the rounded corner of the bottom portion and having a second radius greater than the first radius.

15 Claims, 10 Drawing Sheets

DISPLAY DEVICE

CROSS-REFERENCE TO RELATED APPLICATIONS

This application claims priority to and the benefit of Korean Patent Application No. 10-2015-0139215, filed on Oct. 2, 2015, the entire content of which is hereby incorporated by reference.

BACKGROUND

The present disclosure herein relates to a display device.

Display devices may be classified as a transmissive type, a transflective type, a reflective type, or the like, according to the type of illumination used for the display. Each of the transmissive type display device and the transflective type display device include a display panel, a backlight unit, a support frame, a bottom cover, and a top cover.

The backlight unit includes a light source generating light and a light guide body guiding light received from the light source to guide the received light to the display panel.

SUMMARY

Aspects of embodiments of the present disclosure are directed toward a display device including a support frame and a bottom cover, which are accurately coupled to each other.

One or more embodiments of the inventive concept provide a display device including: a bottom cover including a bottom portion and a sidewall; a backlight unit located above the bottom portion; a display panel located above the backlight unit; and a support frame. The bottom portion of the bottom cover has at least one rounded corner having a first radius, and a sidewall is bent upward from an edge of the bottom portion. The support frame includes at least one rounded corner having a shape corresponding to the rounded corner of the bottom portion and having a second radius greater than the first radius.

In one or more embodiments, the bottom portion of the bottom cover may include first to fourth rounded corners. The sidewall of the bottom cover may include: a first sidewall and a second sidewall facing each other in a first direction; a third sidewall and a fourth sidewall facing each other in a second direction, the second direction crossing the first direction; and first to fourth corner sidewalls connecting adjacent sidewalls of the first to fourth sidewalls to each other. The first to fourth corner sidewalls of the bottom cover have a shape corresponding to first to fourth rounded corners of the bottom portion of the bottom cover.

In one or more embodiments, each of the first to fourth corner sidewalls of the bottom cover may include an inner surface and an outer surface. The inner surface may have a first curvature radius that is substantially equal to the first radius, and the outer surface may have a second curvature radius that is greater than the first curvature radius.

In one or more embodiments, the second radius may be equal to or greater than the second curvature radius.

In one or more embodiments, the support frame may include: first to fourth straight portions having a shape corresponding to the first to fourth sidewalls of the bottom cover, respectively; and first to fourth corners having a shape corresponding to the first to fourth corner sidewalls of the bottom cover, respectively.

In one or more embodiments, each of the first to fourth corners of the support frame may include a fixed part and a support part extending from the fixed part. The fixed part may include: a top surface; an outer surface facing a corresponding corner sidewall of the first to fourth corner sidewalls of the bottom cover; a bottom surface facing the bottom portion of the bottom cover; and an inner surface configured to connect the top surface to the bottom surface, the inner surface being connected to the support part.

In one or more embodiments, each of the first to fourth sidewalls of the bottom cover may have a first height, and each of the first to fourth corner sidewalls may have a second height that is less than the first height.

In one or more embodiments, each of the first to fourth corners of the support frame may further include a coupling block protruding from the outer surface of the fixed part.

In one or more embodiments, the coupling block may have a thickness that is substantially the same as a thickness of a corresponding corner sidewall.

In one or more embodiments, the backlight unit may include: a light guide body; and a light source configured to provide light to at least one side surface of the light guide body.

BRIEF DESCRIPTION OF THE FIGURES

The above and other features of the present disclosure will become readily apparent by reference to the following detailed description when considered in conjunction with the accompanying drawings wherein.

DETAILED DESCRIPTION

Figure 1:
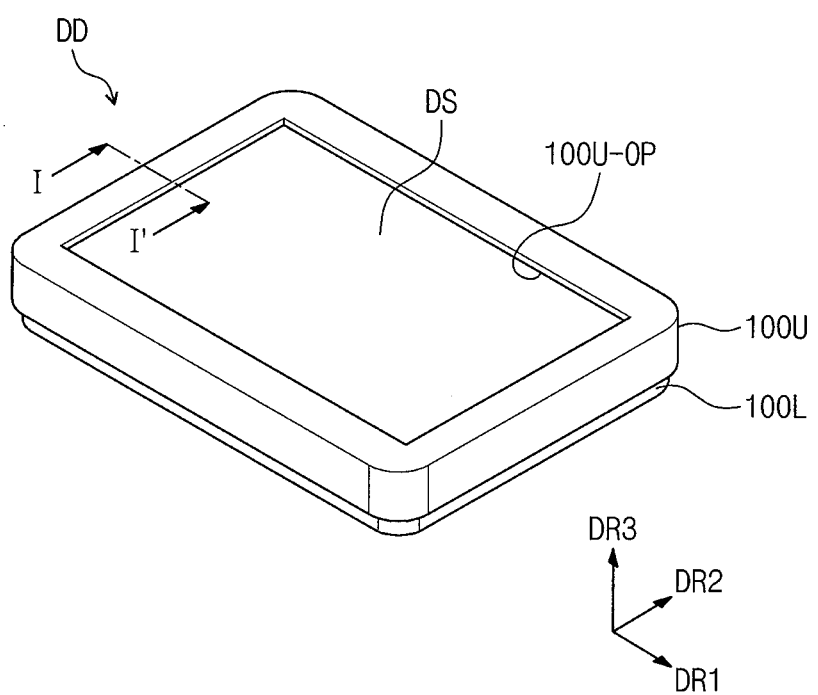
FIG. 1 is a perspective view of a display device according to one or more embodiments of the inventive concept.

Hereinafter, exemplary embodiments of the inventive concept will be described below in more detail with reference to the accompanying drawings. In the following description, the same reference numerals will be assigned to elements and structures having substantially the same function or configuration, and equivalents thereof, and detailed descriptions thereof will be omitted in order to avoid redundancy.

In the drawings, the thickness of layers, films, and regions may be exaggerated for clarity. It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
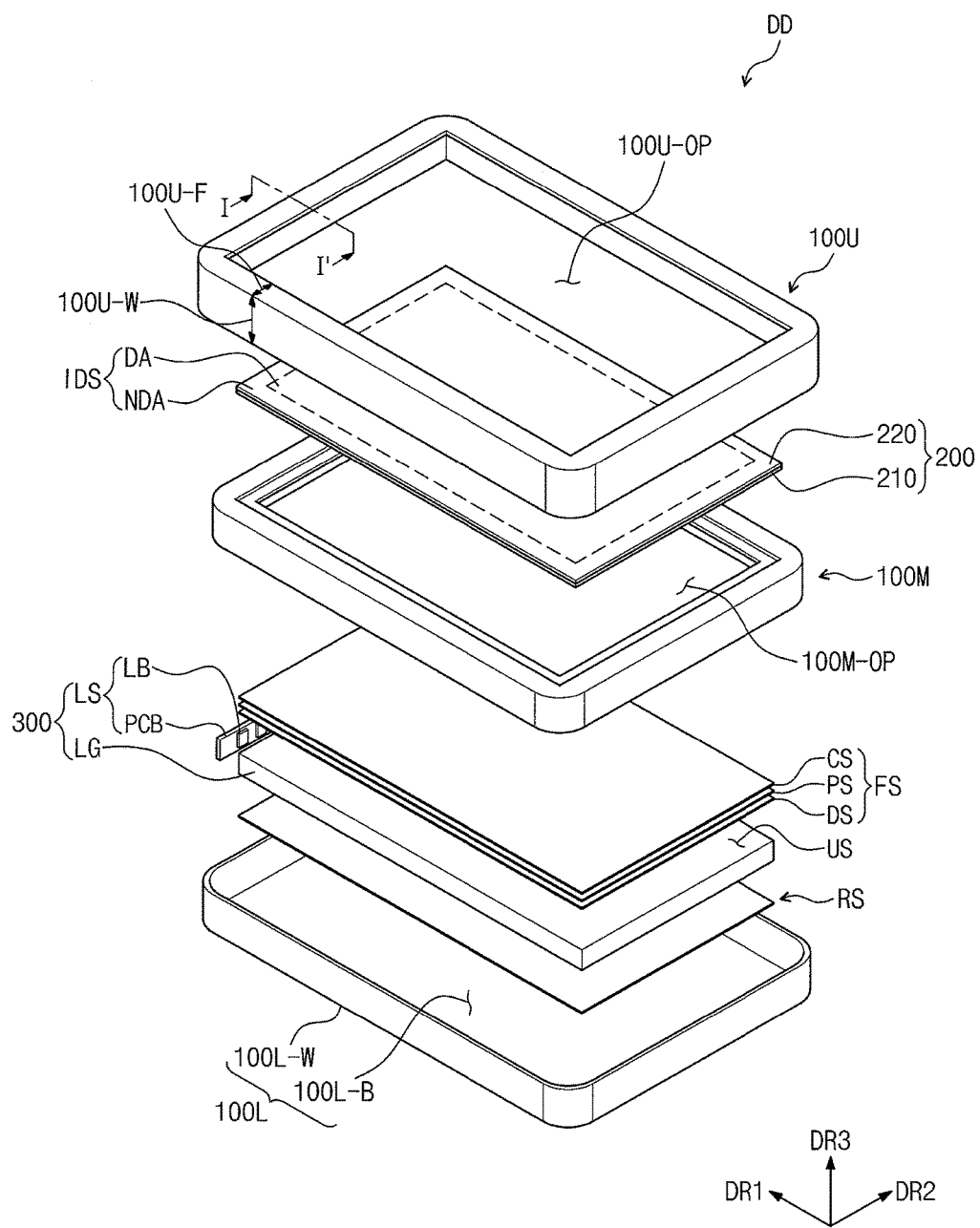
FIG. 2 is an exploded perspective view of the display device according to one or more embodiments of the inventive concept.
Figure 3:
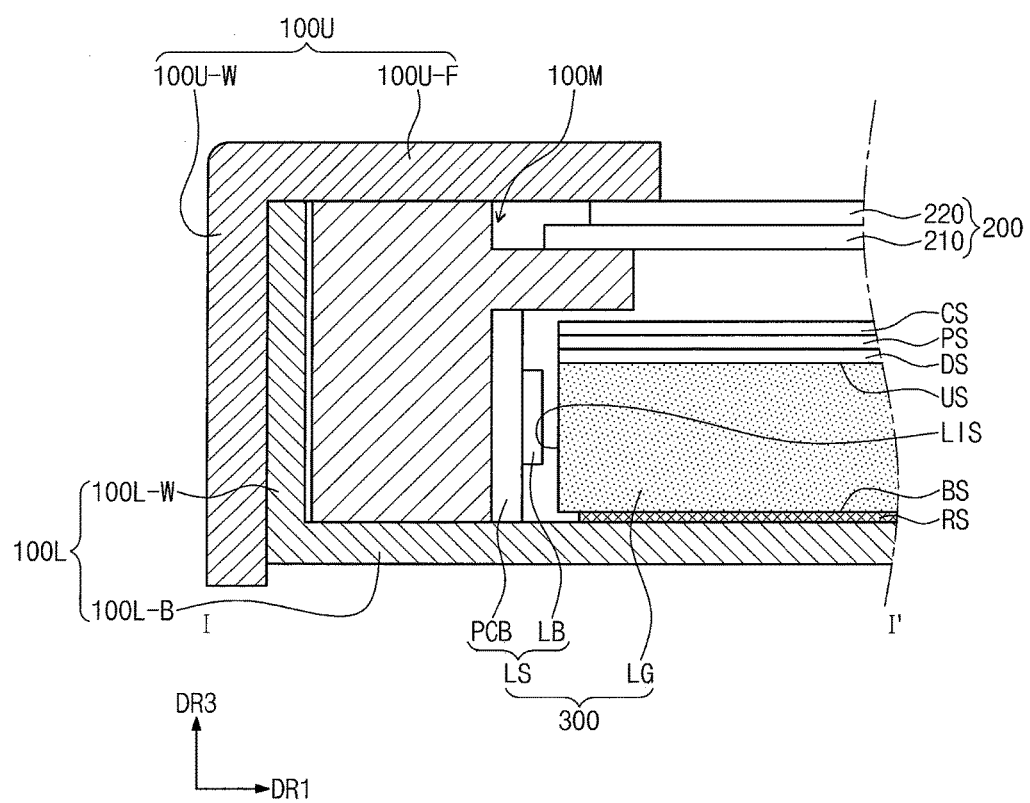
FIG. 3 is a partial cross-sectional view of the display device of FIGS. 1 and 2 according to one or more embodiments of the inventive concept, the cross-section taken along line I-I' of FIGS. 1 and 2.

FIG. 1 is a perspective view of a display device DD according to one or more embodiments of the inventive concept. FIG. 2 is an exploded perspective view of the display device DD according to one or more embodiments of the inventive concept. FIG. 3 is a partial cross-sectional view of the display device DD of FIGS. 1 and 2 according to one or more embodiments of the inventive concept, the cross-section taken along line I-I' of FIGS. 1 and 2.

Although the display device DD illustrated in FIG. 1 is applicable to a monitor according to one or more embodiments of the inventive concept, the inventive concept is not limited thereto or thereby. For example, the display device DD according to one or more embodiments of the inventive concept may be applied to electronic devices such as a television, a notebook computer, a tablet PC, and/or a game console. It should be understood that these are only exemplarily embodiments, and the scope of the inventive concept may include other electronic devices.

As illustrated in FIG. 1, the display device DD may include a display surface DS defined by a first directional axis DR1 and a second directional axis DR2. A third directional axis DR3 indicates a direction normal to (e.g., perpendicular to) the display surface DS. The third directional axis DR3 may be used as a reference axis for distinguishing front and rear surfaces or upper and lower sides. Hereinafter, the first to third spatial directions are respectively indicated by the first to third directional axes DR1 to DR3 and given by the same reference symbols. It should be understood that the directions indicated by each of the first to third directional axes DR1 to DR3 are spatially relative terms and that each of the directional axes may be converted into a different direction.

As illustrated in FIGS. 2 and 3, the display device DD according to one or more embodiments includes protection members 100U, 100M, and 100L, a display panel 200, and a backlight unit 300. The display device DD according to one or more embodiments is a transmissive type or a transflective type display device that may use light provided from the backlight unit 300 to generate an image.

The protection members 100U, 100M, and 100L may be a top cover 100O, a bottom cover 100L, and a support frame 100M. The top cover 100O and the bottom cover 100L may be coupled to each other and may form an outward appearance of the display device DD. Components of the display device DD may be accommodated in a space defined by the top cover 100O and the bottom cover 100L.

The top cover 100U is located above the bottom cover 100L. The top cover 100O allows a portion of the display surface DS of the display panel 200 to be viewed. An opening 100U-OP of the top cover 100O allows, for example, viewing a display area DA of the display surface DS for displaying an image. The top cover 100O covers a non-display area NDA of the display surface DS. The non-display area NDA is an area of the display surface DS in which an image is not generated. In one or more embodiments, the non-display area NDA may surround the display area DA, however the inventive concept is not limited thereto or thereby.

The top cover 1000 may be a rectangular frame having rounded corners (e.g., filleted corners) on a plane defined by the first directional axis DR1 and the second directional axis DR2. The top cover 1000 may include a sidewall 100U-W (hereinafter, referred to as a first sidewall) and a front portion 100U-F. The front portion 100U-F may be bent from (e.g., relative to) the first sidewall 100U-W to overlap the display panel 200. Although the top cover 1000 including the first sidewall 100U-W and the front portion 100U-F is illustrated as one or more embodiments of the inventive concept, the inventive concept is not limited thereto or thereby. According to one or more embodiments of the inventive concept, the top cover 1000 may include only the first sidewall 100U-W (e.g., without the front portion 100U-F). In addition, the shape of the top cover 1000 is not limited thereto or thereby. In one or more embodiments, the shape of the top cover 1000 is such that the top cover 1000 may be assembled with the bottom cover 100L. According to one or more embodiments of the inventive concept, the top cover 100U may be omitted.

The bottom cover 100L is located below the display panel 200. The bottom cover 100L includes a bottom portion 100L-B and a sidewall 100L-W (hereinafter, referred to as a second sidewall) bent upward from (e.g., relative to) an edge of the bottom portion 100L-B. The bottom portion 100L-B may have a rectangular shape having rounded corners (e.g., filleted corners) on a plane defined by the first directional axis DR1 and the second directional axis DR2.

The bottom cover 100L may be manufactured by using a mold and a press. A plate (e.g., a metal plate) may be placed in the mold, and then the plate may be pressurized by the press to manufacture the bottom cover 100L with a shape corresponding to an inner space of the mold. According to the above-described manufacturing method, the second sidewall 100L-W is connected to the entire edge (e.g., perimeter) of the bottom portion 100L-B.

The support frame 100M is located between the top cover 1000 and the bottom cover 100L. The support frame 100M may be located on the bottom portion 100L-B of the bottom cover 100L (see, e.g., FIG. 3). An opening 100M-OP may be located in the support frame 100M. The support frame 100M may be a rectangular frame supporting the display panel 200.

The display panel 200 receives light from the backlight unit 300. In one or more embodiments, for example, the display panel 200 may include a liquid crystal display panel, an electrophoretic display panel, and/or an electrowetting display panel. The display panel 200 according to one or more embodiments may include a first substrate 210, a second substrate 220, and a liquid crystal display panel including a liquid crystal layer located between the first substrate 210 and the second substrate 220.

The backlight unit 300 includes a light source LS generating light and a light guide body LG guiding the light received from the light source LS toward the display panel 200. According to one or more embodiments, the backlight unit 300 may include an edge-type backlight unit including a light guide body LG located above the bottom portion 100L-B of the bottom cover 100L, however the inventive concept is not limited thereto or thereby.

The light source LS may include a printed circuit board PCB and a plurality of light emitting elements LB mounted on the printed circuit board PCB (see, e.g., FIGS. 2 and 3). The printed circuit board PCB may include at least one insulation layer and at least one circuit layer. The circuit layer includes wirings providing a voltage to the plurality of light emitting elements LB. According to one or more embodiments, the printed circuit board PCB may be vertically arranged on the bottom portion 100L-B of the bottom cover 100L as an example, but the inventive concept is not limited thereto or thereby. For example, the printed circuit board PCB may be horizontally arranged, i.e., arranged with its major side in parallel with the bottom portion 100L-B of the bottom cover 100L.

The light guide body LG may be located below the display panel 200. The light guide body LG may include a first surface US, a second surface BS, and a plurality of connecting surfaces (e.g., side surfaces) connecting the first surface US to the second surface BS (see, e.g., FIG. 3). One of the connecting surfaces may face the plurality of light emitting elements LB, and may be defined as a light incident surface LIS. The light guide body LG may be a rectangular plate.

The first surface US is a surface that may output light incident from the light incident surface LIS (e.g., light received on the light incident surface LIS). The first surface US may face the display panel 200. The second surface BS is a surface that may face in a direction normal to the first surface US. The second surface BS may face the bottom portion 100L-B of the bottom cover 100L.

The display device DD may include optical sheets DS, PS, and CS and a reflective sheet RS to improve efficiency of light provided to the display panel 200. The optical sheets DS, PS, and CS are located between the first surface US of the light guide body LG and the display panel 200.

The optical sheets DS, PS, and CS may include a diffusion sheet DS, a prism sheet PS, and/or a protection sheet CS. The diffusion sheet DS may diffuse light output from the first surface US of the light guide body LG. The prism sheet PS may collect the light output from the first surface US of the light guide body LG in a direction normal or perpendicular to the display panel 200 (e.g., in a direction normal or perpendicular to a length or a major surface of the display panel 200). The protection sheet CS may protect the prism sheet PS.

The reflective sheet RS may be located below the light guide body LG. The reflective sheet RS may reflect light leaked from (e.g., light transmitted by) the second surface BS of the light guide body LG, or the like, to be reincident on the second surface BS of the light guide body LG (e.g., to prevent light from being transmitted to the bottom portion 100L-B of the bottom cover 100L). According to one or more embodiments of the inventive concept, one or more of the optical sheets DS, PS, and CS and/or the reflective sheet RS may be omitted.

Figure 4A:
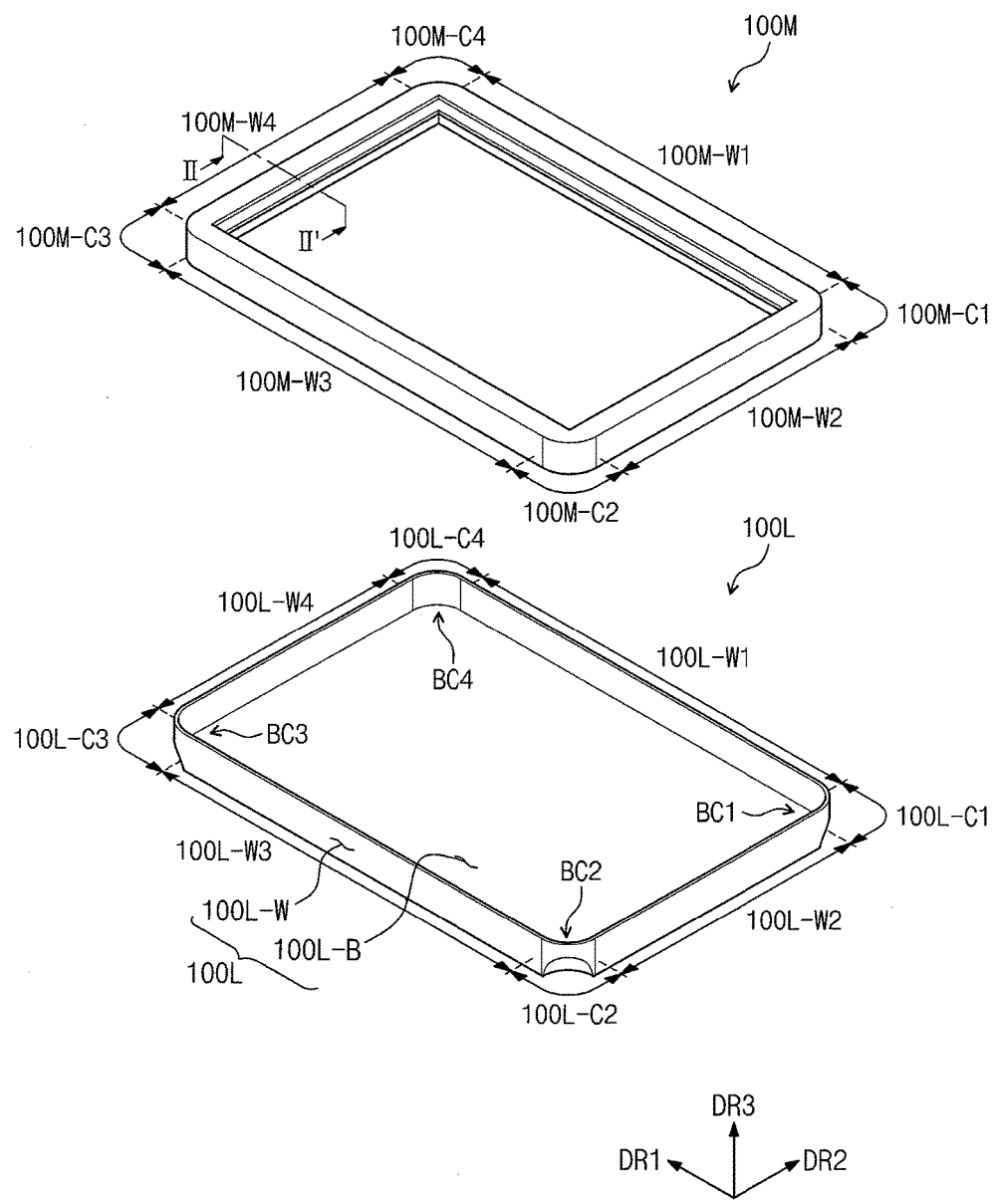
FIG. 4A is an exploded perspective view of a bottom cover and a support frame according to one or more embodiments of the inventive concept.
Figure 4B:
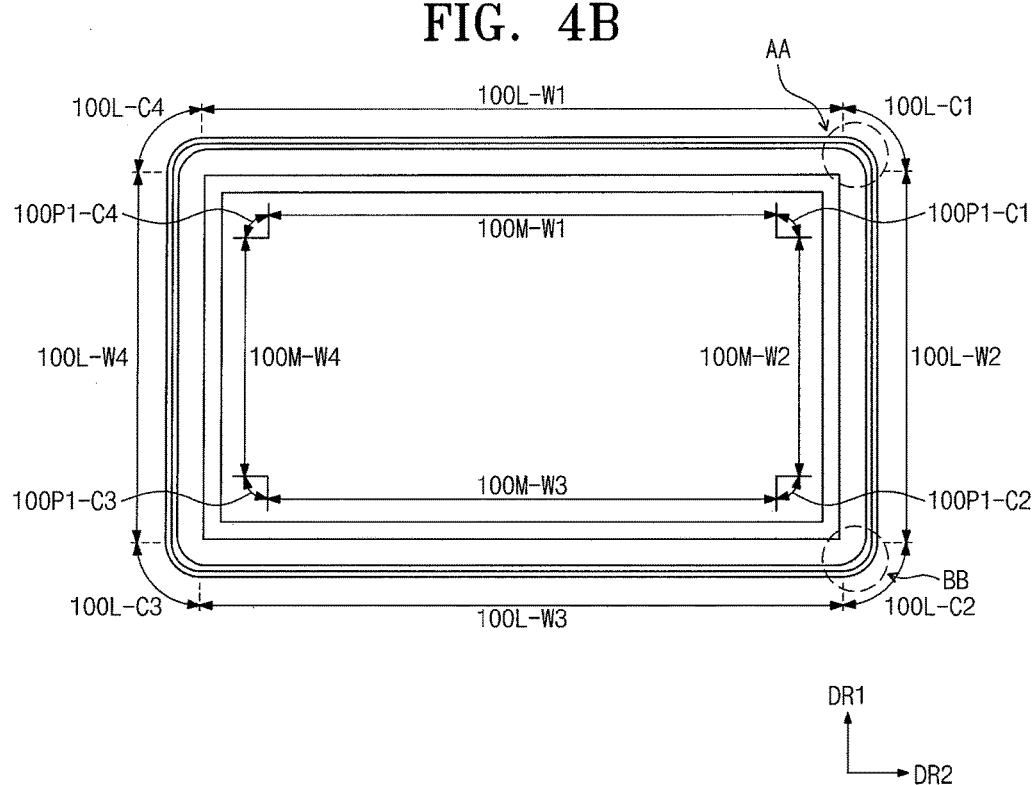
FIG. 4B is a plan view illustrating a state in which the bottom cover and the support frame, which are illustrated in FIG. 4A, are coupled to each other.
Figure 4C:
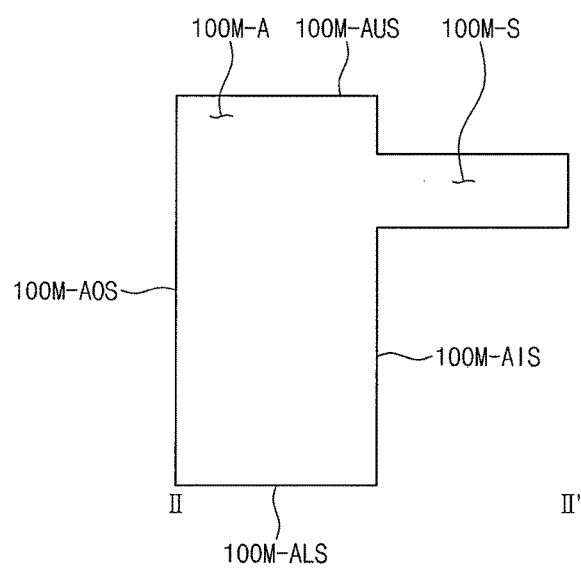
FIG. 4C is a cross-sectional view of the support frame in FIG. 4A, the cross-section taken along line II-II' of FIG. 4A.
Figure 4D:
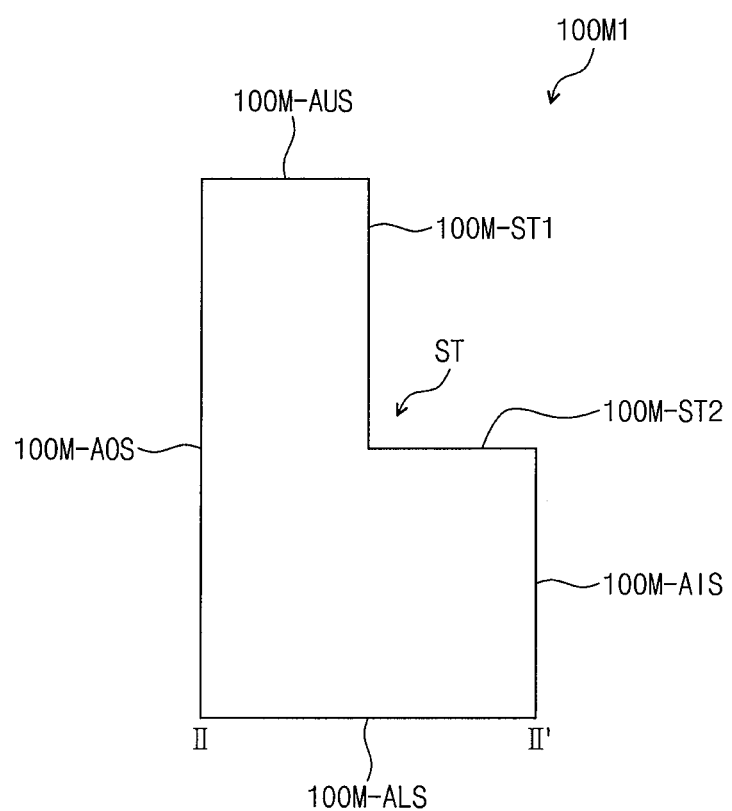
FIG. 4D is a cross-sectional view of a support frame according to one or more embodiments of the inventive concept.

FIG. 4A is an exploded perspective view of the bottom cover 100L and the support frame 100M according to one or more embodiments of the inventive concept. FIG. 4B is a plan view illustrating a state in which the bottom cover 100L and the support frame 100M, which are illustrated in FIG. 4A, are coupled to each other. FIG. 4C is a cross-sectional view of the support frame 100M in FIG. 4A, the cross-section taken along line II-II' of FIG. 4A. FIG. 4D is a cross-sectional view of a support frame 100M1 according to one or more embodiments of the inventive concept.

As illustrated in FIGS. 4A and 4B, in one or more embodiments, the bottom portion 100L-B of the bottom cover 100L may include rounded corners BC1 to BC4. The bottom portion 100L-B including the first to fourth rounded corners BC1 to BC4 is illustrated as an example.

The second sidewall 100L-W connected to the edge of the bottom portion 100L-B (e.g., an integrated second sidewall 100L-W connected to the entire edge (e.g., perimeter) of the bottom portion 100L-B) may be divided into a plurality of portions. The second sidewall 100L-W may include first to fourth corner sidewalls 100L-C1 to 100L-C4 connecting first to fourth sidewalls 100L-W1 to 100L-W4 to adjacent sidewalls among the first to fourth sidewalls 100L-W1 to 100L-W4. The first to fourth sidewalls 100L-W1 to 100L-W4 are portions extending from four sides (e.g., edges) of the bottom portion 100L-B in the third direction DR3. The first to fourth corner sidewalls 100L-C1 to 100L-C4 are portions extending from first to fourth rounded corners BC1 to BC4 of the bottom portion 100L-B in the third direction DR3.

The support frame 100M may be divided into a plurality of portions. The support frame 100M may include first to fourth straight portions 100M-W1 to 100M-W4 respectively corresponding to (e.g., having a shape corresponding to) the first to fourth sidewalls 100L-W1 to 100L-W4 of the second sidewall 100L-W. The support frame 100M may include first to fourth corners 100M-C1 to 100M-C4 connecting adjacent straight portions among the first to fourth straight portions 100M-W1 to 100M-W4 to each other. The first to fourth corners 100M-C1 to 100M-C4 correspond to (e.g., may have a shape corresponding to) the first to fourth corner sidewalls 100L-C1 to 100L-C4 of the second sidewall 100L-W, respectively.

In one or more embodiments, each of the first to fourth straight portions 100M-W1 to 100M-W4 and each of the first to fourth corners 100M-C1 to 100M-C4 may have a cross-sectional shape as depicted in FIG. 4C. Each of the first to fourth straight portions 100M-W1 to 100M-W4 and each of the first to fourth corners 100M-C1 to 100M-C4 may be divided into a fixed part 100M-A and a support part 100M-S. According to one or more embodiments of the inventive concept, the support part 100M-S of each of the first to fourth straight portions 100M-W1 to 100M-W4 and/or the support part 100M-S of each of the first to fourth corners 100M-C1 to 100M-C4 may be omitted.

As illustrated in FIG. 4C, the fixed part 100M-A may include a top surface 100M-AUS, an outer surface 100M-AOS, a bottom surface 100M-ALS, and an inner surface 100M-AIS. The fixed part 100M-A may contact with the top surface 100M-AUS and the bottom surface 100M-ALS. The support part 100M-S protrudes (e.g., extends) from the inner surface 100M-AIS of the fixed part 100M-A. The fixed part 100M-A and the support part 100M-S form a stepped portion. The support part 100M-S may contact the display panel 200. The bottom surface 100M-ALS contacts the bottom portion 100L-B of the bottom cover 100L and is substantially in parallel to a top surface of the bottom portion 100L-B.

As illustrated in FIG. 4D, the support frame 100M1 may include only a portion corresponding to the fixed part 100M-A of FIG. 4C (e.g., without the support part 100M-S). A stepped portion ST may be defined in the support frame 100M1. The support frame 100M1 may include a first stepped surface 100M-ST1 connected to the top surface 100M-AUS and a second stepped surface 100M-ST2 connected to the inner surface 100M-AIS.

Figure 5:
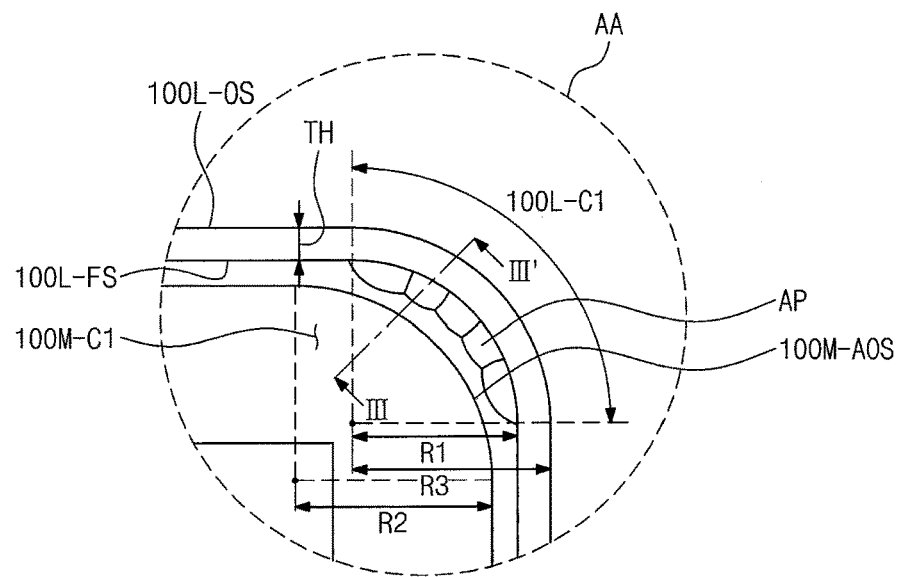
FIG. 5 is an enlarged view of a portion AA of the display device of FIG. 4B according to one or more embodiments of the inventive concept.

Although each of the above-described support frames 100M and 100M1 may include corners having a curved outer surface, as described herein with reference to FIG. 5, the inventive concept is not limited thereto or thereby.

Figure 6:
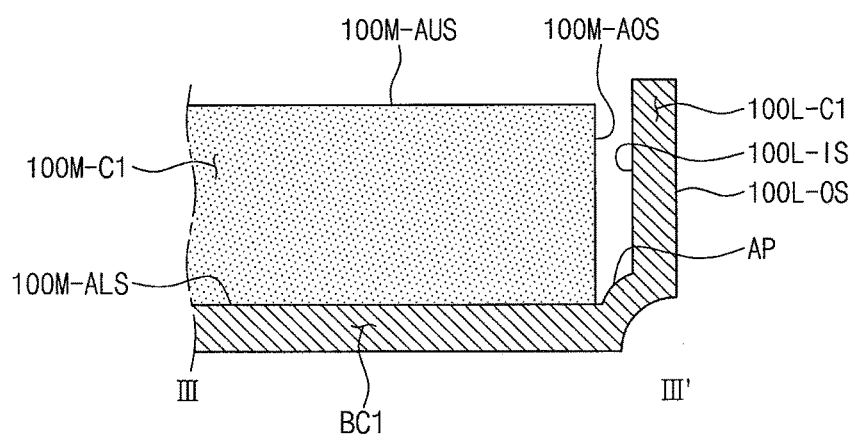
FIG. 6 is a partial cross-sectional view of FIG. 5, the cross-section taken along line III-III' of FIG. 5.

FIG. 5 is an enlarged view of portion AA of the display device DD of FIG. 4B according to one or more embodiments of the inventive concept. FIG. 6 is a partial cross-sectional view of the FIG. 5, the cross-section taken along line III-III' of FIG. 5.

As illustrated in FIGS. 5 and 6, the first corner 100M-C1 is located on the first rounded corner BC1 and faces the first corner sidewall 100L-C1.

The first rounded corner BC1, as a portion of the bottom portion 100L-B, may be a fan shaped portion. The first rounded corner BC1 may have a fan shape having a first radius R1. An edge of the first rounded corner BC1 provides a fan-shaped arc having the first radius R1. The first corner 100M-C1 provides a rounded corner of the support frame 100M. An edge of the top surface 100M-AUS of the first rounded corner 100M-C1 provides a fan-shaped arc having a second radius R2 that may be greater than the first radius R1. The outer surface 100M-AOS of the first corner 100M-C1 may have a curved surface.

The first corner sidewall 100L-C1 of the bottom cover 100L may have a thickness TH (e.g., a predetermined thickness). Because the first corner sidewall 100L-C1 extends upward from an edge of the first rounded corner BC1, the first corner sidewall 100L-C1 has a curvature (e.g., a predetermined curvature). An inner surface 100L-IS of the first corner sidewall 100L-C1 has a first curvature radius that is the same as the first radius R1. An outer surface 100L-OS of the first corner sidewall 100L-C1 has a second curvature R3 that is greater than the first radius R1. The inner surface 100L-IS of the first corner sidewall 100L-C1 and the outer surface 100L-OS of the first corner sidewall 100L-C1 are a portion of the inner surface 100L-IS of the sidewall 100L-W and a portion of the outer surface 100L-OS of the sidewall 100L-W, respectively.

In one or more embodiments, the sidewall 100L-W of the bottom cover 100L may not be sharply bent from the bottom portion 100L-B, based on the process used for manufacturing the bottom cover 100L. This result may occur in the corner areas. An embossing pattern AP may be generated between the first rounded corner BC1 and the first corner sidewall 100L-C1.

Due to the rounded corners of the support frame 100M, although the embossing pattern AP is generated, the support frame 100M and the bottom cover 100L may be accurately positioned. In one or more embodiments, the first corner 100M-C1 of the support frame 100M does not contact the embossing pattern AP, and the first to fourth straight portions 100M-W1 to 100M-W4 and the first to fourth sidewalls 100L-W1 to 100L-W4 are spaced apart at a uniform distance from each other.

In one or more embodiments, the first radius R1 may be equal to or less than the second curvature R3. Such a configuration may maintain a sufficient gap between the inner surface 100L-IS of the first corner sidewall 100L-C1 and the outer surface 100M-AOS of the first corner 100M-C1 because the embossing pattern AP has a size (e.g., a thickness) less than the thickness TH of the first corner sidewall 100L-C1.

In one or more embodiments, the bottom cover 100L and the support frame 100M may be designed with the dimensions depicted in Table 1, below, in consideration of a generated embossing pattern AP. The second radius R2 may have the relative dimensions from Table 1 to prevent the inner surface 100L-IS of the first corner sidewall 100L-C1 and the outer surface 100M-AOS of the first corner 100M-

C1 from being excessively spaced apart from each other (e.g., to provide a desired gap between the inner surface 100L-IS of the first corner sidewall 100L-C1 and the outer surface 100M-AOS of the first corner 100M-C1).

TABLE 1

| Product | Thickness (TH) | First Radius/First Curvature Radius (R1) | Second Radius (R2) | Second Curvature Radius (R3) |
|---|---|---|---|---|
| Tablet PC | 0.15 mm~0.3 mm | R1 = R3 − TH | R3 ≤ R2 ≤ R3 + TH | 1.0 mm~2.0 mm |
| Monitor | 0.5 mm~0.8 mm | R1 = R3 − TH | R3 ≤ R2 ≤ R3 + TH | 3.0 mm~4.0 mm |

Figure 7:
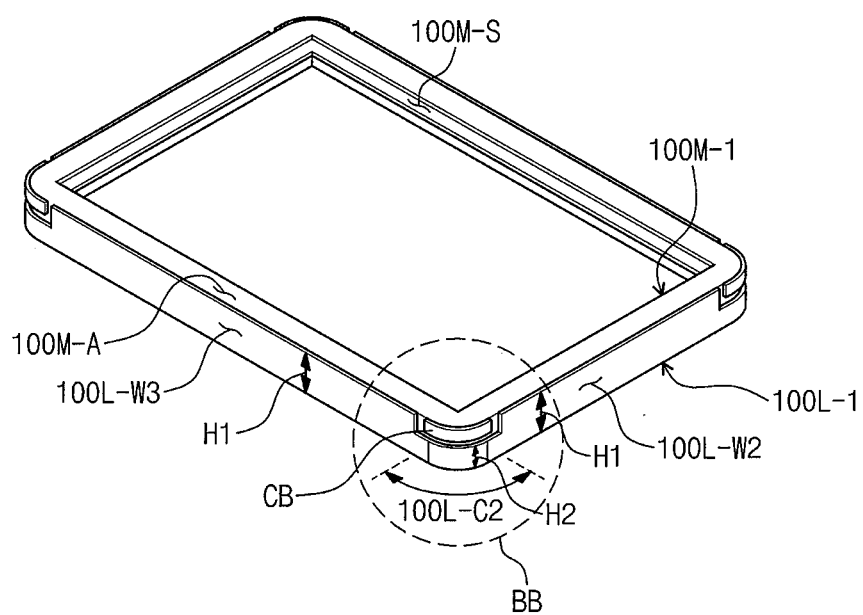
FIG. 7 is a perspective view of a bottom cover and a support frame according to one or more embodiments of the inventive concept.
Figure 8:
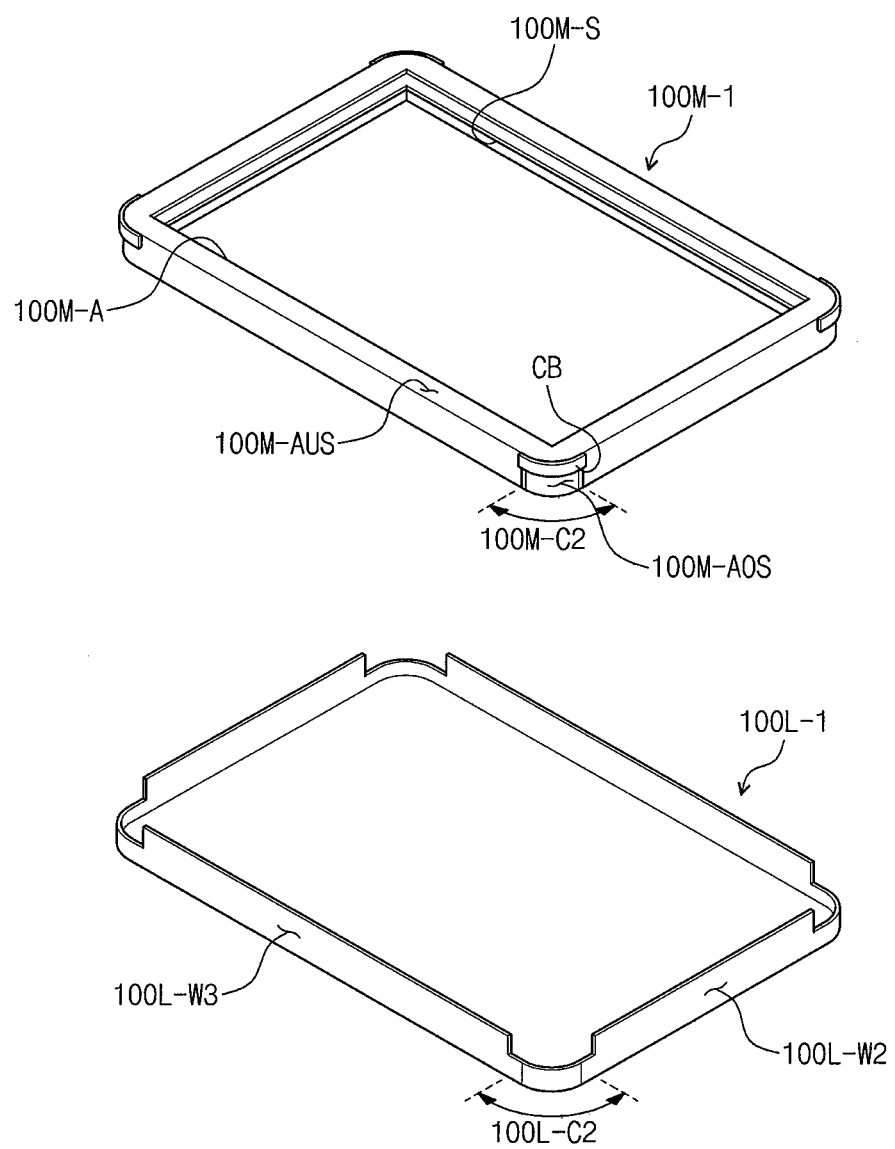
FIG. 8 is an exploded perspective view of the bottom cover and the support frame according to one or more embodiments of the inventive concept.
Figure 9:
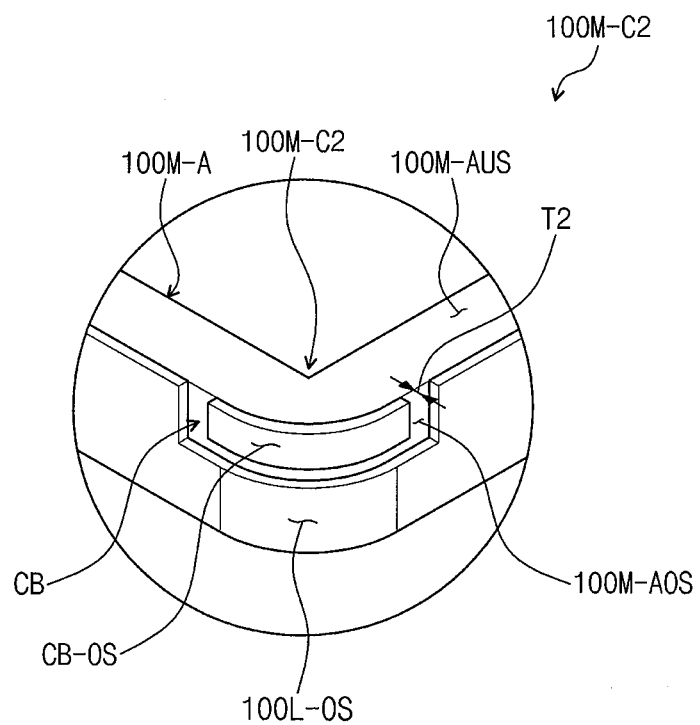
FIG. 9 is an enlarged perspective view of a corner area BB of the display device of FIG. 7 according to one or more embodiments of the inventive concept.

FIG. 7 is a perspective view of a bottom cover 100L-1 and a support frame 100M-1 according to one or more embodiments of the inventive concept. FIG. 8 is an exploded perspective view of the bottom cover 100L-1 and the support frame 100M-1 according to one or more embodiments of the inventive concept. FIG. 9 is an enlarged perspective view of a corner area BB of the display device of FIG. 7 according to one or more embodiments of the inventive concept. Parts and portions that are identical or similar to parts and portions of the embodiments of FIGS. 1 to 6 will be described with the same reference numerals and the description thereof is not repeated. The area BB (e.g., similar to that of FIG. 4B) will be described with reference to FIGS. 7 to 9.

As illustrated in FIGS. 7 and 9, sidewalls 100L-W2 and 100L-W3 of a bottom cover 100L-1 may have a different height from that of a corner sidewall 100L-C2 of the bottom cover 100L-1. Each of the sidewalls 100L-W2 and 100L-W3 may have a first height H1, and the corner sidewall 100L-C2 may have a second height H2 that is less than the first height H1. The sidewall 100L-W may have a partially removed shape (e.g., a cutout shape in the corner sidewall 100L-C2). Because the sidewalls 100L-W2 and 100L-W3 of the bottom cover 100L-1 have a different height from that of the corner sidewall 100L-C2, the bottom cover 100L-1 may provide a coupling groove in the corner area.

The corner 100M-C2 of the support frame 100M-1 may include a coupling block CB protruding from the outer surface 100M-AOS of the fixed part 100M-A. The coupling block CB may be located in a coupling groove of the sidewall 100L-W. The coupling block CB may improve a coupling (e.g., coupling force) between the bottom cover 100L-1 and the support frame 100M-1.

The coupling block CB may have a thickness T2 (hereinafter, referred to as a second thickness) that is substantially the same as the thickness TH of the sidewall 100L-W. The second thickness T2 has a length protruding from the outer surface 100M-AOS of the fixed part 100M-A. The coupling block CB may have a shape corresponding to the removed portion (e.g., cutaway portion) of the sidewall 100L-W of the bottom cover 100L-1. That is, the coupling block CB may provide an outer surface CB-OS defining the same surface as (e.g., aligned with) the outer surface 100L-OS of the sidewall 100L-W.

In one or more embodiments where a defect of the embossing pattern occurs on the corners of the bottom cover in a process for manufacturing the bottom cover, the support frame and the bottom cover may be accurately assembled. This is because the support frame is located adjacent to the sidewall of the bottom cover in most areas except for the corner areas, and the support frame is spaced relatively far from the sidewall of the bottom cover in the corner area. That is, the embossing pattern does not contact the support frame.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A display device comprising:
   a bottom cover comprising a bottom portion having at least one rounded corner having a first radius and a sidewall bent upward from an edge of the bottom portion;
   a backlight unit located above the bottom portion;
   a display panel located above the backlight unit; and
   a support frame located within the bottom cover to support the display panel, the support frame comprising at least one rounded corner having a shape corresponding to and spaced apart from the rounded corner of the bottom portion of the bottom cover and having a second radius greater than the first radius;
   wherein the bottom portion of the bottom cover comprises first to fourth rounded corners;
   wherein the sidewall of the bottom cover comprises a first sidewall and a second sidewall facing each other in a first direction, a third sidewall and a fourth sidewall facing each other in a second direction, the second direction crossing the first direction, and first to fourth corner sidewalls connecting adjacent sidewalls of the first to fourth sidewalls to each other;
   wherein the first to fourth corner sidewalls of the bottom cover have a shape corresponding to first to fourth rounded corners of the bottom portion of the bottom cover;
   wherein the support frame comprises first to fourth straight portions having a shape corresponding to the first to fourth sidewalls of the bottom cover, respectively, and first to fourth corners having a shape corresponding to the first to fourth corner sidewalls of the bottom cover, respectively;
   wherein the first to fourth straight portions connect the first to fourth corners;
   wherein each of the first to fourth corners of the support frame comprises a fixed part and a support part extending from the fixed part; and
   wherein the fixed part comprises a top surface, an outer surface facing a corresponding corner sidewall of the first to fourth corner sidewalls of the bottom cover, a bottom surface facing the bottom portion of the bottom cover; and an inner surface configured to connect the top surface to the bottom surface, the inner surface being connected to the support part.

2. The display device of claim 1, wherein each of the first to fourth corner sidewalls comprises an inner surface and an outer surface, and
   wherein the inner surface has a first curvature radius that is substantially equal to the first radius, and the outer surface has a second curvature radius that is greater than the first curvature radius.

3. The display device of claim 2, wherein the second radius is equal to or greater than the second curvature radius.

4. The display device of claim 1, wherein each of the first to fourth sidewalls of the bottom cover has a first height, and each of the first to fourth corner sidewalls of the bottom cover has a second height that is less than the first height.

5. The display device of claim 4, wherein each of the first to fourth corners of the support frame further comprises a coupling block configured to protrude from the outer surface of the fixed part of the support frame.

6. The display device of claim 5, wherein the coupling block has a thickness that is substantially the same as a thickness of a corresponding corner sidewall of the bottom cover.

7. The display device of claim 1, wherein the backlight unit comprises:
a light guide body; and
a light source configured to provide light to at least one side surface of the light guide body.

8. The display device of claim 1, further comprising a top cover coupled to the bottom cover, the top cover having an opening for viewing at least a portion of the display panel.

9. A display device comprising:
a bottom cover comprising a bottom portion and a sidewall bent upward from an edge of the bottom portion, wherein the sidewall comprises first and second sidewalls facing each other in a first direction, third and fourth sidewalls facing each other in a second direction crossing the first direction, and first to fourth corner sidewall connecting adjacent sidewalls among the first to fourth sidewalls;
a backlight unit located above the bottom cover;
a display panel located above the backlight unit; and
a support frame located within the bottom cover to support the display panel, the support frame comprising first to fourth straight portions respectively having a shape corresponding to the first to fourth sidewalls of the bottom cover and first to fourth corners respectively having a shape corresponding to the first to fourth corner sidewalls of the bottom cover,
wherein each of the first to fourth corner sidewalls of the bottom cover comprises an inner surface having a first curvature radius and an outer surface having a second curvature radius, the second curvature radius being greater than the first curvature radius,
wherein each of the first to fourth corners of the support frame comprises a top surface, an outer surface facing a corresponding corner sidewall of the first to fourth corner sidewalls of the bottom cover, a bottom surface facing the bottom portion of the bottom cover, and an inner surface configured to connect the top surface to the bottom surface, wherein a portion of the outer surface of each of the first to fourth corners of the support frame is spaced apart from inner surfaces of the first to fourth corner sidewalls of the bottom cover, and
wherein the outer surface of the first to fourth corners of the support frame has a third curvature radius that is greater than the first curvature radius.

10. The display device of claim 9, wherein the third curvature radius is equal to or greater than the second curvature radius.

11. The display device of claim 9, wherein each at least one of the first to fourth sidewalls of the bottom cover has a first height, and at least one of the first to fourth corner sidewalls of the bottom cover has a second height that is less than the first height.

12. The display device of claim 11, wherein the at least one of the first to fourth corner sidewalls of the bottom cover comprises an opening forming a coupling groove, and a corresponding corner of the support frame further comprises a coupling block configured to protrude into the coupling groove of the bottom cover.

13. The display device of claim 12, wherein the coupling block has a thickness that is substantially the same as a thickness of a corresponding corner sidewall.

14. The display device of claim 12, wherein the coupling groove of the bottom cover extends completely through the at least one of the first to fourth corner sidewalls.

15. The display device of claim 14, wherein the coupling block protrudes into the coupling groove such that the coupling block forms a portion of an outer surface of the display device.

* * * * *